United States Patent [19]

Rohani et al.

[11] Patent Number: 5,583,886
[45] Date of Patent: Dec. 10, 1996

[54] METHOD FOR DETERMINING A PLURALITY OF CHANNEL RESPONSES AND MODIFYING A RECEIVED SIGNAL THEREWITH

[75] Inventors: Kamyar Rohani; Amitava Ghosh, both of Fort Worth; R. Mark Harrison, Grapevine, all of Tex.

[73] Assignee: Motorola, Inc., Schaumburg, Ill.

[21] Appl. No.: 985,051

[22] Filed: Dec. 3, 1992

[51] Int. Cl.$^6$ .............................. H04B 3/46; H04B 17/00
[52] U.S. Cl. .......................... 375/227; 375/326; 375/341; 455/226.1; 455/33.1
[58] Field of Search .................................. 375/13, 99, 94, 375/10, 231, 346, 349, 343, 227, 202, 205, 326, 341, 262; 455/33.1, 67.1, 53.1, 54.1, 56.1, 226.1, 38.1; 370/110.1; 371/43

[56] References Cited

U.S. PATENT DOCUMENTS

| | | | |
|---|---|---|---|
| 4,599,732 | 7/1986 | LeFever | 375/13 |
| 5,091,918 | 2/1992 | Wales | 375/99 |
| 5,199,047 | 3/1993 | Koch | 375/13 |
| 5,297,169 | 3/1994 | Bockström et al. | 375/13 |
| 5,303,226 | 4/1994 | Okanoue et al. | 375/231 |
| 5,381,443 | 1/1995 | Borth et al. | 375/202 |

OTHER PUBLICATIONS

Digital Communications, Second Edition by John G. Proakis, Ph.D., P.E., pp. 304–318.

Nonlinear Estimation of PSK–Modulated Carrier Phase with Application to Burst Digital Transmission by Andrew J. Viterbi, Fellow, IEEE, and Audrey M. Viterbi, Member, IEEE, IEEE Transactions on Information Theory, vol. II–29, No. 4, Jul. 1983, pp. 543–551.

Primary Examiner—Tesfaldet Bocure
Attorney, Agent, or Firm—Raymond J. Warren

[57] ABSTRACT

Each of a plurality of transmitters (31–37) transmits (62) one of a plurality of known signals. The known signals being known to a receiver (40). The receiver (40) then measures the known signals (63); and using those measurements, estimates the plurality of channel responses (64). The channel responses are then used to determine a power ratio parameter (65) and a phase correction parameter (66).

17 Claims, 3 Drawing Sheets

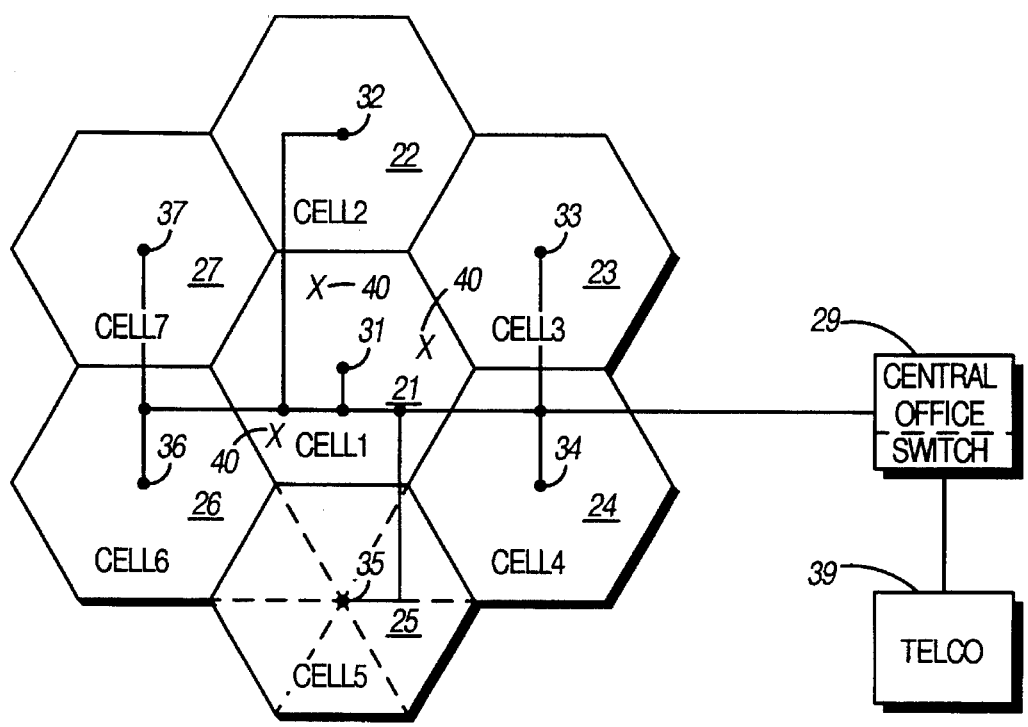
FIG.3   —PRIOR ART—
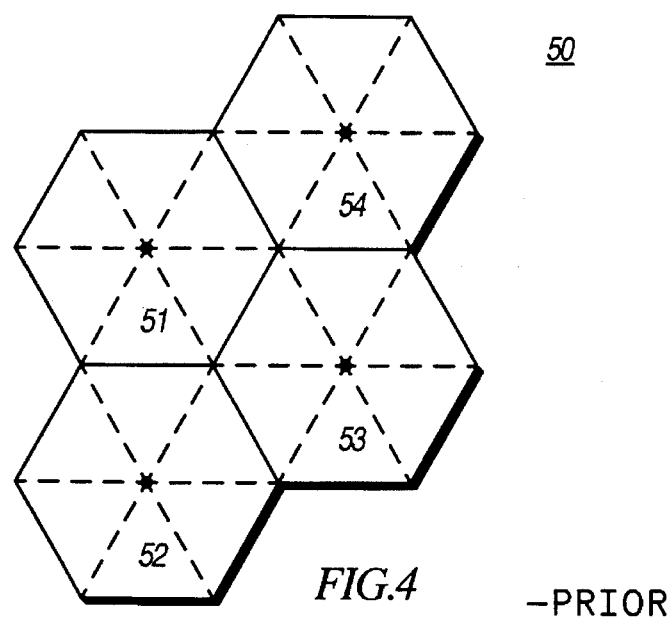
FIG.4   —PRIOR ART—

METHOD FOR DETERMINING A PLURALITY OF CHANNEL RESPONSES AND MODIFYING A RECEIVED SIGNAL THEREWITH

FIELD OF THE INVENTION

The present invention relates, in general, to communication systems and, more particularly, to a method for determining a channel response and modifying a received signal therewith in a communication system.

BACKGROUND OF THE INVENTION

In the area of CDMA (Code Division Multiple Access), particularly SFH-CDMA (Slow Frequency Hop-CDMA), it is important to compute an accurate estimate of the carrier-to-interference, or channel power ratio, for each hop. It is also important that the channel phase, induced due to multipath signals, be estimated accurately. Together, these two parameters, channel gain and phase, are referred to herein as channel response parameters.

Examples of measuring channel gain and phase are known in the art. However, these methods are typically computationally involved and result in relatively long delays in making the estimates.

Carrier phase recovery methods based on M-th power law devices and decision-feedback PLLs (Phase Locked Loops) are also known in the art. See Viterbi, Andrew & Viterbi, Audrey, *Nonlinear Estimation of PSK-Modulated Carrier Phase with Application to Burst Digital Transmission*, 29 IEEE Trans. on Information Theory 543–51 (July 1983) and Proakis, DIGITAL COMMUNICATIONS, 304–18 (2nd ed. 1989). However, use of these techniques in SFH-CDMA systems is hampered by the short hop duration which does not give the PLL or averaging schemes time to operate. In addition, these schemes operate under the assumption that the channel is an additive white Gaussian noise channel. In a synchronized SFH-CDMA system, this is an incorrect assumption since all of the symbols (desired and undesired) are synchronized. As a result, to a correlator receiver, the sum of interferers does not appear as white Gaussian noise.

Therefore, there exists a need in the art for a method of determining a channel response that is not subject to the above deficiencies.

SUMMARY OF THE INVENTION

In a communication system having a receiver and a plurality of transmitters, a method for determining a plurality of channel responses is provided. The method commences by transmitting, from each of the plurality of transmitters, one of a plurality of known signals. The known signals being known to the receiver. The receiver then measures the received known signals; and uses those measurements to estimate the plurality of channel responses such as the channel phase and gain (power ratio).

Once the channel responses have been determined, they are used to modify the received signal either after demodulation or while being decoded in the Viterbi decoder. In the particular embodiments presented, the phase correction will typically be performed on the demodulated signal. The channel gain can be corrected either at the same point as the phase correction, or the gain parameter can be used to modify the Viterbi metric, which will then correct the received signal.

BRIEF DESCRIPTION OF THE DRAWINGS

FIG. 3 is a block diagram of a prior art 7-cell reuse pattern;

FIG. 4 is a block diagram of a prior art 4-cell reuse pattern; and

DETAILED DESCRIPTION OF THE DRAWINGS

Figure 1:
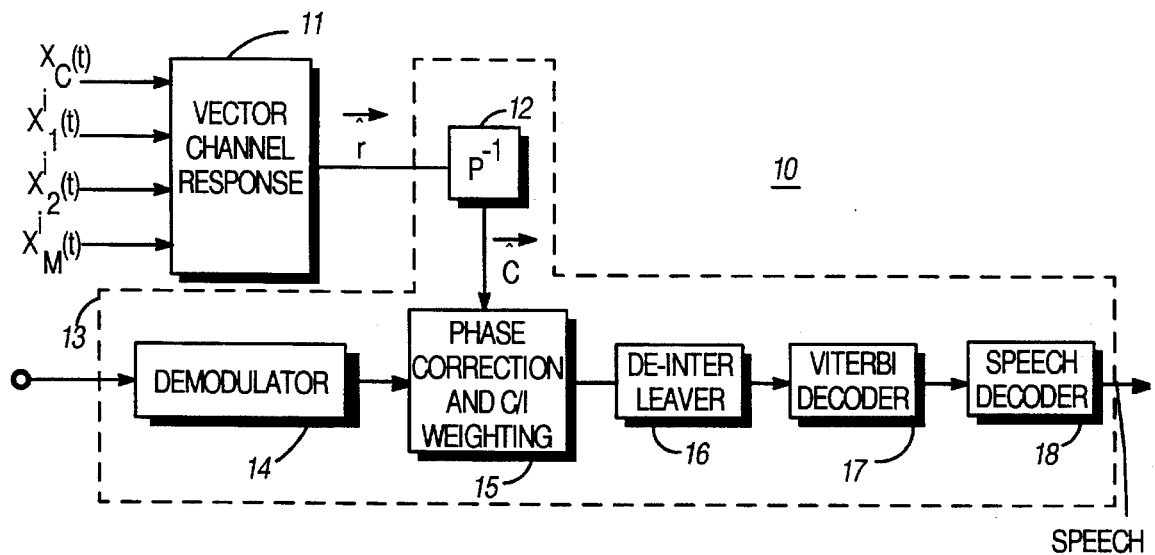
FIGS. 1 and 2 are block diagrams of a portion of a receiver for use in a communication system providing alternative embodiments of the present invention.

Referring initially to FIG. 1, a block diagram of a receiver, generally designated 10, for use in a communication system embodying the present invention is illustrated. A signal is received by receiver 10 at port 13 and is demodulated in demodulator 14. The demodulated signal is provided to a phase correcting and C/I (carrier-to-interference), or power ratio, weighting circuit 15.

To represent the effects of multipath, the received vector $\bar{x}(t)$ is perturbed (multiplied) by a channel response vector $\bar{c}$ in vector channel response 11 to produce received waveform vector $\bar{r}$. The waveform $\bar{r}$ is then perturbed in a perturbing circuit 12 with a well conditioned matrix $P^{-1}$ to determine the channel response $\hat{C}$. A well conditioned matrix is one for which an inverse or pseudo inverse exists. Given the channel response, the channel gain and phase coefficients can be estimated.

The demodulated signal is phase corrected and weighted with estimated C/I using the channel response from perturbing circuit 12. The resulting signal is forwarded to a deinterleaver 16. Deinterleaver 16 performs the inverse function of an interleaver. The interleaving separates and reorders adjacent bits so that if a segment of the transmitted signal is corrupted, deinterleaved, consecutive bits will not be effected. Once deinterleaved, the corrupted bits are randomly spread throughout the final signal such that their impact is minimized and, as such, correctable by the Viterbi decoder.

The deinterleaved signal is transmitted to Viterbi decoder 17 which forms a trellis to estimate sequences of data. The sequences of data form a soft decision signal which is an estimate of a data sequence actually transmitted (i.e. the signal as received less the distortions caused by transmission over a multipath channel).

The metric used by the Viterbi decoder is illustrated below in equation (1).

$$\text{metric} = Z_R I_R^* \qquad (1)$$

where:

$Z_R$ is the deinterleaved symbol; and $I_R^*$ is the conjugate of $I_R$ which, for a QPSK system, is taken from the set defined in equation (2).

$$I_R \in e^{j(2n+1)(\pi/4)} \qquad (2)$$

where:

n is from the set 0, 1, 2, or 3.

The corrected digital signal out of Viterbi decoder 17 is then transmitted to a speech decoder 18 where it is finally decoded to provide the analog speech output.

Figure 2:
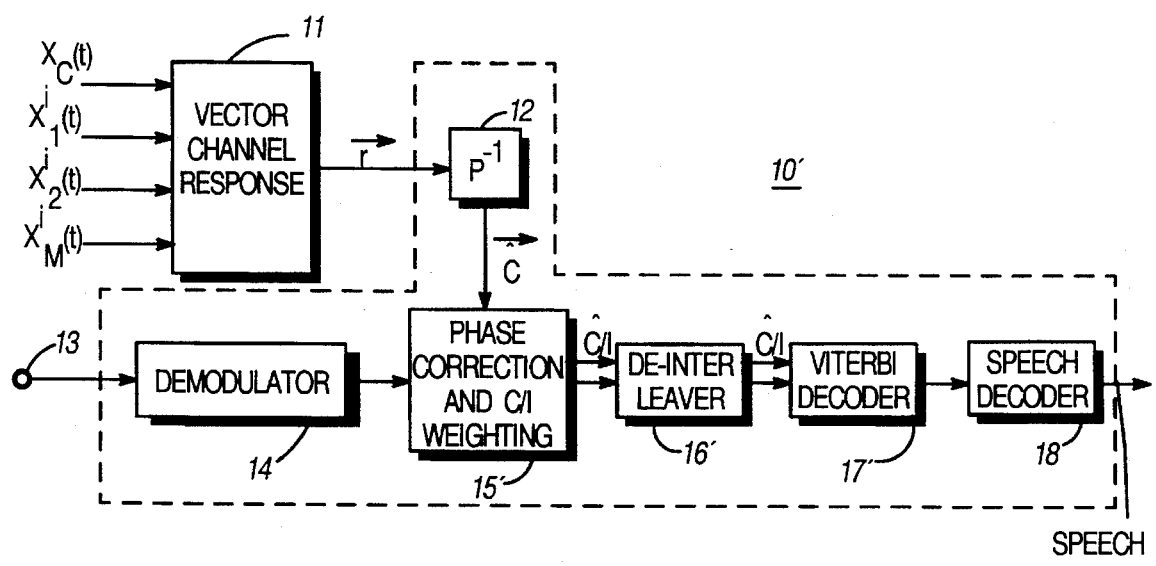

Another embodiment of the present invention is illustrated in FIG. 2. The difference between receivers 10 and 10' is that in block 15', only phase correction occurs. The power ratio parameter is determined in 15', but the correction is not made at that time. The phase corrected signal and the power ratio parameter are both passed to deinterleaver 16' where the power ratio parameter is processed in the same manner as the phase corrected signal.

Both deinterleaved signals are then forwarded to Viterbi decoder 17'. In decoder 17', the power ratio parameter is used to modify the Viterbi metric of equation (1) above as follows.

$$\text{metric} = \eta Z_R I_R^* \quad (3)$$

where $\eta$ is the power ratio $\hat{C}/I$.

The vector channel response circuit 11 and perturbing circuitry 12, above, operate with the assumption that, with short hopping (SFH-CDMA) durations, the channel response is relatively constant from one hop to the next. This assumption is supported by results that show that, for a subscriber unit moving at 35 mph, fading occurs at a Doppler rate of 30 Hz. With a hopping rate of 500 Hz (2 ms windows) the channel response is relatively constant.

In operation, a signal $\bar{x}(t)$ is received which is defined by, $$\bar{x}(t) = [x^c(t), x_1^i(t), x_2^i(t), \ldots, x_M^i(t)]^T \quad (4)$$

where:

$x^c(t)$ is the desired signal; and $x_1^i(t)$, $x_2^i(t)$, and $x_M^i(t)$ are interferers.

The signal vector is then perturbed by a channel response vector $\bar{c}$ which is defined by, $$\bar{c} = [R_0 e^{j\phi_0}, R_1 e^{j\phi_1}, R_2 e^{j\phi_2}, \ldots, R_M e^{j\phi_M}]^T. \quad (5)$$

The received waveform, $r(t)$, is determined by:

$$r(t) = \bar{x}(t)^T \cdot \bar{c} = R_0 e^{j\phi_0} x^c(t) + \sum_{m=1}^{M} x^i m(t) \cdot R_m e^{j\phi_m}. \quad (6)$$

If N pilot symbols are transmitted per hop, the received vector per hop is, $$\bar{r} = P^T \cdot \bar{c} = \begin{bmatrix} x^c(t_1) & x^c(t_2) & \ldots & x^c(t_N) \\ x_1^i(t_1) & x_1^i(t_2) & \ldots & x_1^i(t_N) \\ \ldots & \ldots & \ldots & \ldots \\ x_M^i(t_1) & x_M^i(t_2) & \ldots & x_M^i(t_N) \end{bmatrix} \cdot \bar{c}. \quad (7)$$

At the receiver, the channel response is computed from:

$$\hat{c}^T = \bar{r}^T \cdot P^{-1} = [c_0, c_1, \ldots, c_M]^T \quad (8)$$

where P is any well conditioned matrix. Given the channel response $\hat{c}^T$, estimated C/I (power gain) and channel phase are determined from:

$$\widehat{C/I} = \frac{|c_0|^2}{|c_1|^2 + |c_2|^2 + \ldots + |c_M|^2} \quad (9)$$

and $$\text{Carrier Phase} = \hat{\phi}_0 = \arg[c_0]. \quad (10)$$

The foregoing process provides a technique that is less computationally involved than the existing technologies and, therefore, results in shorter processing delays. Also, this technique is not subject to the problems caused by the short hop durations found in the PLL techniques.

Referring now to FIG. 3, a standard 7-cell reuse cellular pattern is illustrated. When utilizing the present invention on a forward channel (transmission from a base site 31 to a subscriber unit 40), where the bases 31–37 are synchronized, each cell 21–27 transmits a pre-assigned pilot code on every hop. In a congested urban area, a common cell size can be 1.5 to 3.0 kilometers. This would result in an expected propagation delay of 10 to 15 μsec (microseconds). Since these delays are much smaller than a symbol duration (e.g. 200 μsec), the decorrelation at subscriber unit 40 is able to isolate the appropriate signal.

On the reverse channel (transmissions from subscriber unit 40 to the base site 31), each subscriber 40 is given a pilot code at the time of call set-up and a new code whenever a hand-off occurs. The dynamic code assignment is monitored by the switch at a central office location 29. In assigning the codes, the system should select the codes in a manner to keep the P matrix invertible. For a QPSK (Quadrature Phase Shift Keyed) constellation with three pilots per hop, there are $4^3$, or 64, possible combinations. However, not all of the possible combinations are non-singular matrices.

In a 6-sector cell (FIG. 4, cells 51–54), only 4 codes, in a 4-cell reuse pattern 50, are required. With QPSK, orthogonal codes can be generated using:

$$P = \begin{bmatrix} e^{j\pi/4} & e^{j\pi/4} \\ e^{j3\pi/4} & -e^{j3\pi/4} \end{bmatrix} \quad (11)$$

recursively to provide:

$$P_{m+1} = \begin{bmatrix} P_m & P_m \\ P_m & -P_m^* \end{bmatrix}. \quad (12)$$

To meet the 4-cell reuse pattern criteria, at least 4 pilots are needed per hop (creating a 4×4 orthogonal matrix). It should be noted here, that orthogonality of codes is not a requirement, although it does make the code design simpler.

Figure 5:
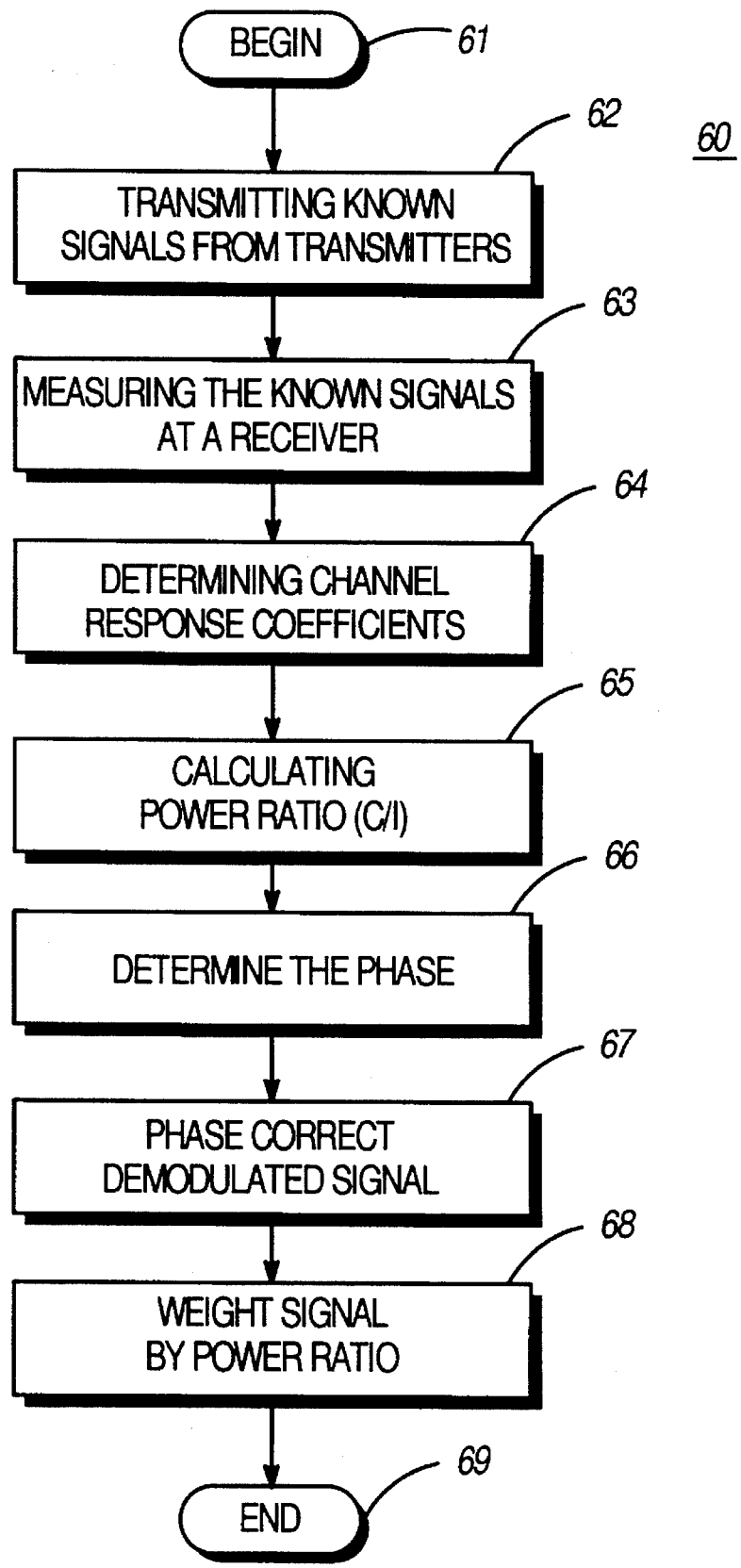
FIG. 5 is a flow chart illustrating a method for determining a channel response.

Referring now to FIG. 5, a flow chart illustrating a method, generally designated 60, for determining and compensating for the channel response is presented. Method 60 commences at step 61 and proceeds to step 62 where known signals are transmitted from a plurality of transmitters. These known signals are then measured at a receiver, step 63. The measured signals are then used to determine channel response coefficients, step 64, for use in decoding a received signal.

Method 60 next calculates a power ratio of the main channel power to a sum of the power of any interfering channel (C/I ratio), step 65; and determines a phase, step 66, of the desired signal. The phase of the demodulated signal is then corrected, step 67, which is performed in phase correction circuit 15 or 15'.

A soft erasure is then performed on the signal by weighting the demodulated signal by the power ratio parameter, step 68. This step can either occur prior to deinterleaving the signal (e.g. circuit 15) or it can be performed simultaneously with the Viterbi decoding (i.e. circuit 15') by modifying the Viterbi algorithm.

Thus, it will be apparent to one skilled in the art that there has been provided in accordance with the invention, a method for determining a channel response that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. In a communication system having a receiver and a plurality of transmitters, a method for determining a plurality of channel responses, said method comprising the steps of:

transmitting from each of said plurality of transmitters one of a plurality of known signals, each of said plurality of known signals being known to said receiver;

measuring said plurality of known signals at said receiver;

estimating said plurality of channel responses using said plurality of known signals measured at said receiver; and estimating a carrier-to-interference (C/I) ratio for a desired signal using said plurality of channel responses.

2. The method of claim 1 further comprising the step of calculating a ratio of a main channel power to a sum of a power of an interfering channel following said step of estimating said plurality of channel responses.

3. The method of claim 1 wherein the step of estimating said plurality of channel responses comprises the step of determining a plurality of channel response coefficients using an inverse of a known signal matrix and said plurality of known signals measured at said receiver.

4. The method of claim 1 further comprising the step of estimating a phase of said desired signal using an estimate of a phase change caused by a channel on said desired signal, wherein the estimate of phase change is calculated in response to the estimated carrier-to-interference ratio.

5. In a communication system having a receiver and a plurality of transmitters, a method for determining a plurality of channel responses and modifying a received signal therewith, said method comprising the steps of:

transmitting from each of said plurality of transmitters one of a plurality of known signals, said plurality of known signals being known to said receiver;

measuring said plurality of known signals at said receiver;

determining a plurality of channel response coefficients using an inverse of a known signal matrix and said plurality of known signals measured by said receiver; and calculating a ratio of a main channel power of the received signal to a sum of a power of a plurality of interfering channels using said plurality of channel response coefficients.

6. The method of claim 5 further comprising the step of modifying a metric of a Viterbi decoder using said ratio of said main channel power to said sum of said power of said plurality of interfering channels.

7. The method of claim 5 further comprising the step of estimating a phase of a desired signal using an estimate of a phase change caused by a channel on said desired signal, wherein the estimate of phase change is calculated in response to the calculated ratio of a main channel to the sum of a power of a plurality of interference channel.

8. The method of claim 5 wherein said plurality of known signals are distributed among the plurality of transmitters, for transmission by the plurality of transmitters, in an n-cell reuse pattern where n is a number of distinct known cells.

9. The method of claim 8 wherein the n-cell reuse pattern is a 4-cell reuse pattern.

10. In a communication system having a receiver and a plurality of transmitters, a method for determining a plurality of channel responses and modifying a received signal therewith, said method comprising the steps of:

transmitting from each of said plurality of transmitters one of a plurality of known signals, said plurality of known signals being known to said receiver;

measuring said plurality of known signals at said receiver;

determining a plurality of channel response coefficients using an inverse of a known signal matrix and said plurality of known signals measured by said receiver; and calculating, using said plurality of channel response coefficients, a ratio of a main channel power of the received signal to a sum of a power of a plurality of interfering channels.

11. The method of claim 10 wherein said ratio of said main channel power to said sum of said power of said plurality of interfering channels is a carrier-to-interference (C/I) ratio for a desired signal.

12. The method of claim 11 further comprising the step of using said C/I ratio in an error correcting decoder.

13. The method of claim 12 wherein said error correcting decoder is a Viterbi decoder.

14. The method of claim 11 further comprising the step of estimating a phase of said desired signal using an estimate of a phase change caused by a channel on said desired signal, wherein the estimate of phase change is calculated in response to the calculated ratio of a main channel to the sum of a power of a plurality of interference channel.

15. The method of claim 10 wherein said plurality of known signals are distributed among the plurality of transmitters, for transmission by the plurality of transmitters, in an n-cell reuse pattern where n is a number of distinct known cells.

16. The method of claim 15 wherein the n-cell reuse pattern is a 4-cell reuse pattern.

17. In a communication system having a receiver and a plurality of transmitters, a method for determining a plurality of channel responses, said method comprising the steps of:

transmitting from each of said plurality of transmitters one of a plurality of known signals, said plurality of know signals being known to said receiver;

measuring said plurality of known signals at said receiver;

determining a plurality of channel response coefficients using an inverse of a known signal matrix and said plurality of known signals measured at said receiver; and estimating a carrier-to-interference (C/I) ratio, using said plurality of channel response coefficients, for a desired signal transmitted from a desired one of said plurality of transmitters whereby said C/I ratio is used as an input coefficient to a Viterbi decoder to decode a received signal.

* * * * *